US012707466B2

(12) United States Patent
Christoffersson et al.

(10) Patent No.: US 12,707,466 B2
(45) Date of Patent: Aug. 11, 2026

(54) BEAM INDICATION IN RANDOM ACCESS

(71) Applicant: Telefonaktiebolaget LM Ericsson (PUBL), Stockholm (SE)

(72) Inventors: Jan Christoffersson, Luleå (SE); Min Wang, Luleå (SE); Mårten Ericson, Gammelstad (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 491 days.

(21) Appl. No.: 18/041,156

(22) PCT Filed: Aug. 11, 2020

(86) PCT No.: PCT/EP2020/072439

§ 371 (c)(1),
(2) Date: Feb. 9, 2023

(87) PCT Pub. No.: WO2022/033658

PCT Pub. Date: Feb. 17, 2022

(65) Prior Publication Data

US 2023/0328793 A1 Oct. 12, 2023

(51) Int. Cl.

*H04W 74/08* (2024.01)
*H04B 7/06* (2006.01)
*H04W 72/21* (2023.01)
*H04W 74/0833* (2024.01)
*H04W 74/0836* (2024.01)
*H04W 74/0838* (2024.01)

(52) U.S. Cl.

CPC ........ *H04W 72/21* (2023.01); *H04B 7/06952* (2023.05); *H04W 74/0833* (2013.01); *H04W 74/0836* (2024.01); *H04W 74/0838* (2024.01)

(58) Field of Classification Search

CPC ............... H04W 72/21; H04W 74/004; H04W 74/0833; H04W 74/0838; H04W 74/0836; H04B 7/0695

See application file for complete search history.

(56) References Cited

U.S. PATENT DOCUMENTS 11,616,606 B2 * 3/2023 Sun ........................ H04W 72/23 370/329
11,671,149 B2 * 6/2023 Chen .................... H04B 7/0617 375/267

(Continued)

FOREIGN PATENT DOCUMENTS

WO WO-2018232090 A1 * 12/2018 ........... H04B 7/0626
WO 2022 057997 A1 3/2022

OTHER PUBLICATIONS

Erik Dahlman et al., "4G, LTE-Advanced Pro and The Road to 5G 3rd Edition" Clause 11.3.1.4—2016.

(Continued)

*Primary Examiner* — Brian D Nguyen

(74) *Attorney, Agent, or Firm* — Baker Botts L.L.P.

(57) ABSTRACT

There is disclosed a method performed by a wireless device for indicating a selected beam to a network node within a communication network, the method comprising: transmitting a random-access message comprising a physical uplink shared channel (PUSCH) payload as part of a random-access channel (RACH) procedure to the network node, wherein the PUSCH payload comprises content indicating the beam selected by the wireless device.

17 Claims, 8 Drawing Sheets

(56) References Cited

U.S. PATENT DOCUMENTS

| | | | | |
|---|---|---|---|---|
| 12,041,594 | B2 * | 7/2024 | Koskela | H04B 7/0695 |
| 2022/0141879 | A1 * | 5/2022 | Cao | H04W 74/002<br>370/330 |
| 2022/0264618 | A1 * | 8/2022 | Yoshimura | H04W 72/23 |
| 2023/0072763 | A1 * | 3/2023 | Kim | H04W 76/20 |
| 2023/0127256 | A1 * | 4/2023 | Cha | H04W 52/242<br>370/318 |
| 2023/0189209 | A1 * | 6/2023 | Jung | H04W 76/28<br>370/329 |
| 2023/0269696 | A1 * | 8/2023 | Lee | H04W 24/10<br>455/456.1 |

OTHER PUBLICATIONS

3GPP TSG-RAN WG2 Meeting #108; Reno, Nevada; Source: Qualcomm Incorporated; Title: Procedures and MAC CE design for BFR for SCells (R2-1916067 (Revision of R2-1913833))—Nov. 18-22, 2019.
3GPP TSG-RAN WG2 #109 electronic; Elbonia; Source: Ericsson; Title: Beam-specific 2-step RA support (Tdoc R2-2000392 (Revision of R2-1915606))—Feb. 24-Mar. 6, 2020.
3GPP TSG RAN Meeting #82; Sorrento, Italy; Source: ZTE Corporation, Sanechips; Title: New work item: 2-step RACH for NR (RP-182894)—Dec. 10-13, 2018.
PCT Notification of Transmittal of the International Search Report and the Written Opinion of the International Searching Authority, or the Declaration issued for International application No. PCT/EP2020/072439—May 12, 2021.

* cited by examiner

PUSCH RU: $\{DMRS_{K,0}\}$,$\{DMRS_{K,1}\}$

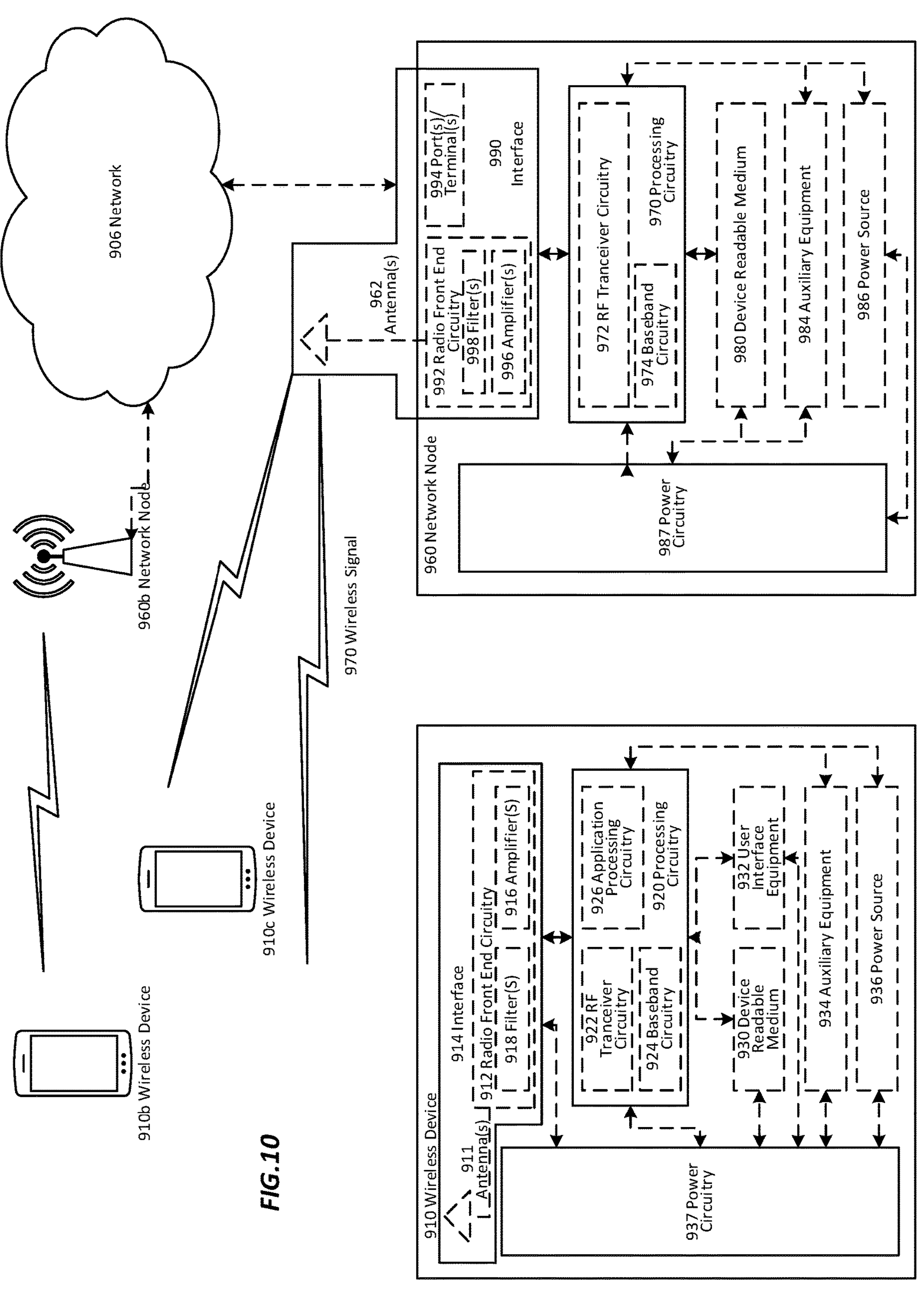
906 Network
960b Network Node
910b Wireless Device
910c Wireless Device
970 Wireless Signal
960 Network Node
962 Antenna(s)
992 Radio Front End Circuitry
998 Filter(s)
996 Amplifier(s)
994 Port(s)/ Terminal(s)
990 Interface
972 RF Tranceiver Circuitry
974 Baseband Circuitry
970 Processing Circuitry
980 Device Readable Medium
984 Auxiliary Equipment
986 Power Source
987 Power Circuitry
910 Wireless Device
911 Antenna(s)
914 Interface
912 Radio Front End Circuitry
918 Filter(S)
916 Amplifier(S)
922 RF Tranceiver Circuitry
924 Baseband Circuitry
926 Application Processing Circuitry
920 Processing Circuitry
930 Device Readable Medium
932 User Interface Equipment
934 Auxiliary Equipment
936 Power Source
937 Power Circuitry
FIG.10

BEAM INDICATION IN RANDOM ACCESS

PRIORITY

This nonprovisional application is a U.S. National Stage Filing under 35 U.S.C. § 371 of International Patent Application Serial No. PCT/EP2020/072439 filed Aug. 11, 2020 and entitled "BEAM INDICATION IN RANDOM ACCESS" which is hereby incorporated by reference in its entirety.

TECHNICAL FIELD

The present disclosure relates to techniques for indicating a selected beam by a wireless device as part of a random-access procedure.

BACKGROUND

In wireless communication networks, a random access ("RA") procedure—also referred to as an initial access procedure—is performed to obtain uplink synchronization between a wireless device and a network node and to obtain a specified ID for radio access communication. An example class of such wireless communication networks are those operating according to the 3GPP New Radio ("NR"), or Fifth Generation ("5G"), radio access technology, where an RA procedure can be performed between a User Equipment ("UE") and access network node, referred to as a gNB.

In certain 5G networks, the gNB is equipped with an antenna array for transmitting beams to UEs within the coverage area of the cell(s) supported by the gNB. As part of the initial access procedure, a UE selects a beam for sending a Physical Random Access Channel ("PRACH", or "RACH") request message on.

From Release 15 of the 3GPP specifications, the UE is to indicate the selected beam to the gNB to enable the gNB to determine in which beam direction to transmit subsequent messages. To select a beam, the UE can measure the reference signal receive power ("RSRP") for a synchronization signal on each received beam (referred to as "SS-RSRP"). The UE can then select a beam taking the SS-RSRP values into account according to some decision logic. For example, the UE might select a beam having an SS-RSRP value above a threshold. If none of the beams have an SS-RSRP value exceeding the threshold, any of the beams might be selected. The UE might select the beam having the highest SS-RSRP value.

For each beam, a number of synchronization signals might be transmitted, including for example a primary synchronization signal ("PSS"), secondary synchronization signal ("SSS") and a physical broadcast channel demodulation reference signal ("PBCH-DMRS"). The reference signals might be transmitted as part of a synchronization signal block ("SSB"), which can be identified by an associated SSB index associated with the particular beam used to transmit that SSB. In other words, for each transmitted beam there is an associated SSB index identifying the respective SSB carried by that beam. Consequently, a UE might indicate a selected beam to the gNB by indicating the associated SSB for that beam.

In current systems, the UE can indicate the beam/SSB to the gNB through the PRACH preamble and/or PRACH occasion ("RO"). The PRACH preamble can be specified by a preamble format and can include a cyclic prefix and sequence and be associated with an identifying index. An RO is an occurrence in uplink time-frequency resources configured for transmission of PRACH preambles. In an extreme configuration, the selected beam is indicated only through the PRACH preamble, i.e. the preamble index will indicate the beam irrespectively of which RO it is transmitted on. In another extreme configuration, the selected beam is indicated only through the RO i.e. irrespectively of the preamble index. In configurations between these two extremes, the selected beam will be indicated through a combination of preamble index and RO.

The number of SSBs/beams the gNB is capable of transmitting—current versions of the 3GPP specifications limit the number of available SSBs to a maximum of 64—impacts how the PRACH and preamble resources are configured to effectively indicate a UE's selected SSB. For example, as the number of SSBs available to the gNB increases, the use of only the preamble index to indicate a selected beam becomes insufficient. Conversely, the greater the number of ROs needed to indicate a selected beam, the higher the latency of the RA procedure and the greater the signaling overhead in terms of configured ROs. Hence, when the number of available SSBs is high, preambles and ROs will be a scarce resource and the RA configuration will have to balance the latency and overheads of increased ROs with the demand for allocation of preamble indexes to purposes other than SSB indication.

SUMMARY

According to one aspect of the present disclosure there is provided a method, wireless device and computer-readable medium as set out in the appended claims.

BRIEF DESCRIPTION OF THE DRAWINGS

The invention may best be understood by referring to the following description and accompanying drawings that are used to illustrate particular embodiments of the invention. In the drawings:

FIG. 10 is a further example of a communication network.

DETAILED DESCRIPTION

The present disclosure is directed to approaches for indicating a selected beam to a network node that do not require indication through the RO or PRACH preambles. Instead, in accordance with the techniques herein, an indication of a selected beam is provided through a PUSCH payload transmitted as part of a random-access procedure (e.g. a two-step or four-step random access procedure). This enables PRACH preambles to be freed up by removing the beam-to-preamble mapping, which may be particularly advantageous in evolved systems where preambles are scarce due to the extensive number of downlink beams. By removing the preamble-beam mapping, more preambles can be made available for purposes other than beam indication, for example contention-based random access ("CBRA") and contention-free random access ("CFRA"), allowing more diverse RACH configurations and the support of higher RACH loads since preamble collision probability will be reduced. This will be explained in more detail below.

Figure 1:
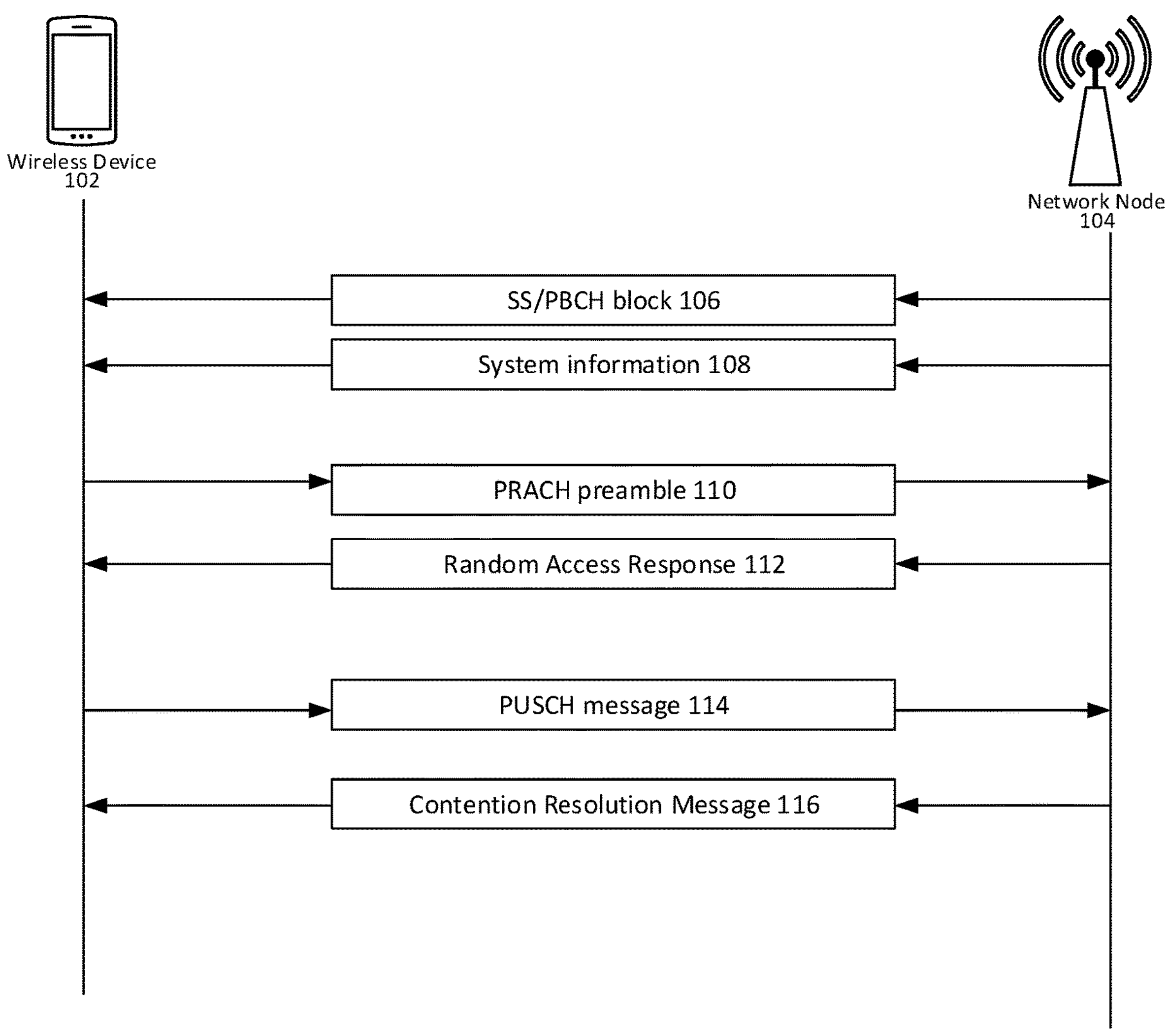
FIG. 1 illustrates a message sequence for a four-step random access procedure.

FIG. 1 shows an example of a four-step random-access ("RA") procedure for a wireless device 102 gaining access to an access network provided by network node 104. This example will be described in the context of a 5G system, for the purpose of illustration only.

The network node (e.g. a gNB) broadcasts synchronization signals 106 and system information 108. The synchronization signals may be transmitted as part of an SSB and include a PSS, SSS and PBCH. The system information might include minimum system information ("MSI") (comprising a master information block ("MIB") and remaining minimum system information ("RMSI")) and other system information ("OSI"). The network node 104 might transmit the synchronization and system information through beam sweeping, which is a technique to transmit downlink beams in multiple directions at periodic time intervals. Each beam will carry a respective SSB. That is, each beam carries an SSB with a respective SSB index value mapped to that beam.

The wireless device 102 (e.g. a UE) measures the received beams and selects one of the beams based on those measurements. This may be referred to beam measurement and beam determination. As described above, the wireless device might measure the strength of the received beams by measuring the SS-RSRP of each beam, and then select a beam based on the SS-RSRP values. For example, the wireless device 102 might select a beam having an SS-RSRP value that exceeds a threshold value. If multiple beams have SS-RSRP values exceeding the threshold, the beam with the highest SS-RSRP value might be selected. If none of the beams have SS-RSRP values exceeding the threshold, the wireless device might select the beam with the highest SS-RSRP value. For contention-based random access ("CBRA"), the wireless device might select a beam by selecting its associated SSB according to the decision logic of 3GPP TS 38.321:

1> else (i.e. for the contention-based Random Access preamble selection):
  2> if at least one of the SSBs with SS-RSRP above rsrp-ThresholdSSB is available:
    3> select an SSB with SS-RSRP above rsrp-ThresholdSSB.
  2> else:
    3> select any SSB.

After detecting the synchronization signals and decoded the system information for the selected beam, the wireless device 102 transmits a PRACH preamble 110 (denoted msg1) in the uplink on an RO. The PRACH preamble may comprise a cyclic prefix and a preamble sequence, and may be identified by a preamble index.

In response to receiving the PRACH preamble (msg1) the network node 104 replies with a random access response (RAR) message 112 (denoted msg2). The wireless device 102 can subsequently transmit a device identification message 114 on PUSCH (denoted msg3) using a configured uplink grant (i.e. using allocated uplink transmission resources).

The wireless device 102 transmits message 3 (on PUSCH) after receiving a timing advance command in the RAR message 112, allowing PUSCH to be received at the network node 104 with a timing accuracy within the cyclic prefix ("CP"). Without this timing advance, a large CP would be needed in order to be able to demodulate and detect PUSCH, unless this approach were applied in a cell with a small distance between wireless device and network node. Since NR will also support larger cells with a need for providing a timing advance to the UE, the 4-step approach is relevant for the random-access procedure in NR systems. To complete the RA procedure, the network node sends a contention resolution message ("CRM") 116 (denoted message 4), which contains the contention resolution ID. The wireless device 102 can determine from this ID it has been correctly identified by the network node 104.

Figure 2:
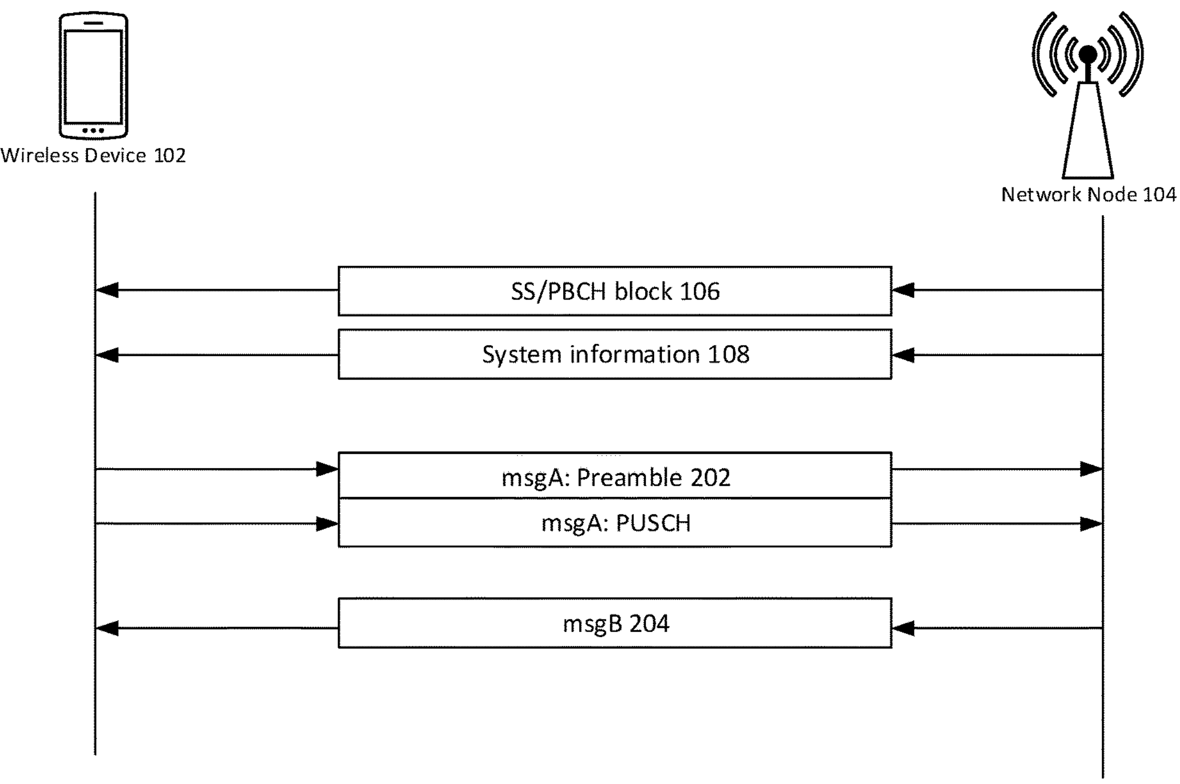
FIG. 2 illustrates a message sequence for a two-step random access procedure.

A two-step RA work item for Release 16 of the 3GPP specifications has been approved in the RAN1 #82 plenary meeting. An example two-step RA procedure is shown in FIG. 2.

The network node 104 broadcasts synchronization signals and system information at 106 and 108 through beam sweeping as described above with respect to FIG. 1.

Upon selecting a beam, the wireless device 102 transmits a message 202 (referred to as message A, or msgA) to the network node. Message A comprises a PRACH preamble (denoted "msgA Preamble") and a payload on the PUSCH (denoted "msgA PUSCH"). In other words, message A comprises a first message portion (msgA Preamble) transmitted on a RO and a second message portion (msgA PUSCH) transmitted on PUSCH. Thus, only the msgA payload (msgA PUSCH) is sent on the PUSCH. Message A may additionally comprise higher layer data such as a radio resource control ("RRC") connection request.

The PUSCH in msgA can in some implementations be transmitted immediately after an associated PRACH preamble. In other words, the PRACH preamble and msgA PUSCH might be contiguous in time resources. The time-frequency resources for msgA PUSCH might be reserved within the cell, at least for the transmission of msgA PUSCH in conjunction with initial access, i.e. as part of an initial access procedure.

Figures 3, 4:
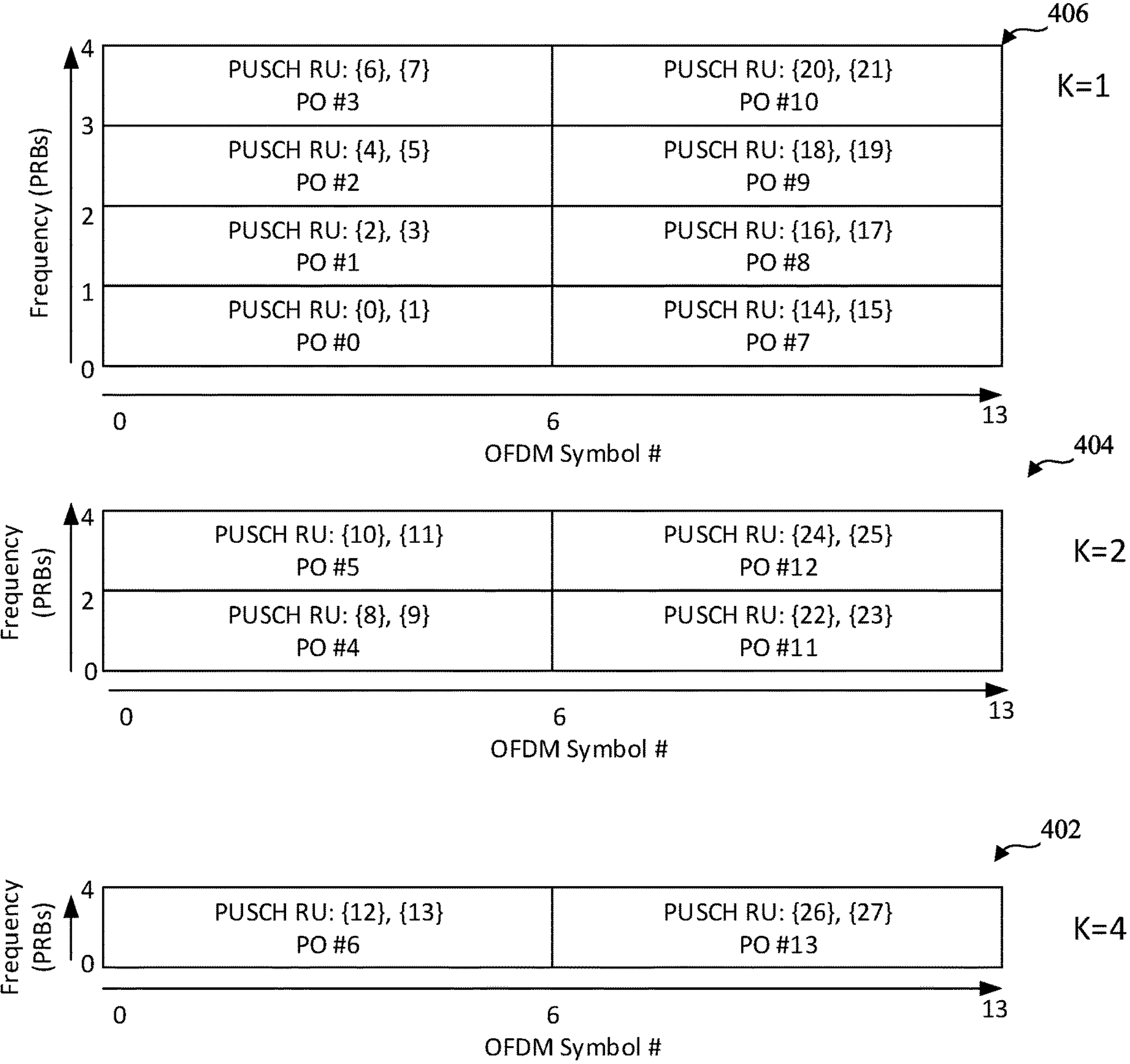
FIG. 3 illustrates an example PUSCH occasion for transmitting msgA of the two-step random access procedure.
FIG. 4 illustrates an example of a PUSCH set of multiple PUSCH occasions.

The msgA PUSCH may be transmitted in time-frequency resource locations referred to as PUSCH occasions ("PO"). Each PO may span multiple contiguous symbols in time and contiguous physical resource blocks ("PRBs") in frequency. Each PO might be associated with a demodulation reference signal ("DMRS") port and DMRS sequence, with the PO, DMRS port and sequence pair used for the msgA PUSCH payload transmission referred to as a PUSCH resource unit ("PRU", or "PUSCH RU"). The PRU is associated with, that is corresponds to, a PRACH preamble. FIG. 3 shows an example of a PUSCH occasion. where the subscript indices may be DMRS port and DMRS sequence indices. Alternatively, the subscript indices might indicate other parameters of the DMRS, for example their time and frequency resource locations.

It is also possible to define a set of resources containing multiple PUSCH occasions. This will be referred to herein as an 'msgA PUSCH set'. An msgA PUSCH set might equivalently be referred to as a set of multiple PRUs. A set of PRUs occasions allows multiple-user multiple-input-multiple-output ("MU-MIMO") reception. It further enables multiple wireless devices to share the same PUSCH occasion within a communication network whilst permitting their respective msgA PUSCHs to be decoded by the receiving network node (using the respective DMRS port/sequence pair).

In some implementations, there might be a guard band (expressed in PRBs) or a guard time between consecutive POs of the msgA PUSCH set. In other implementations, there is no guard band and/or time between consecutive POs of the msgA PUSCH set. The time- and frequency-domain resource allocations of the PUSCH POs within a set might be defined with reference to the associated PRACH occasion. Here, the 'associated PRACH occasion' refers to the RO used for transmitting the msgA preamble associated with the msgA PUSCH. An msgA PUSCH set can occur periodically with the same period as the associated RACH occasions and can have a known length in symbols and position in the frequency domain. An msgA PUSCH set can contain multiple POs contiguous in frequency and in time (including guard band or period if defined).

A PUSCH RU (and hence also a PO) can span 'K' PRBs, for some integer K. K can vary, and a given PRB can contain PUSCH RUs with different sizes. K can be identified by which preamble is used; i.e. the value of K for a PRU can be identified from the PRACH preamble associated with that PRU. If a PRB contains PUSCH RUs with different size K, DMRS IDs are a function of size; Total # DMRS=(# PO Sizes)×(PUSCH RUs per PO). UE can randomly select PUSCH RU index 'n' out of the configured set.

FIG. 4 illustrates example msgA PUSCH sets each comprising a set of PRUs, for different values of K. There is shown a first set 402, a second set 404 and a third set 406. Each set spans an equal number of PRBs, which in this example is four. Each set is associated with a respective K value, indicating the number of PRBs spanned by each PRU within the set. Set 402 is associated with K=4 (meaning each PRU within set 402 spans four PRBs); set 404 is associated with K=2 (meaning each PRU within set 404 spans two PRBs); and set 406 is associated with K=1 (meaning each PRU within set 406 spans one PRB). In this example, each set spans 14 symbols in time and comprises two consecutive PRUs in the time domain (each PRU spanning 7 symbols in time). Set 402 therefore comprises two PRUs; set 404 comprises four PRUs and set 406 comprises eight PRUs.

Referring back to FIG. 2, and in response to receiving message A 202, the network node sends a response message 204 (denoted message B, or msgB). Message B may be described as a modified RAR. It might include: a wireless device identifier assignment, timing advance information, and contention resolution message content etc. In addition, message B may contain a higher layer part, that is, a portion for carrying higher layer information. Similarly to a RAR, msgB 204 may contain responses to multiple msgAs, and thus to multiple wireless devices, but the optional higher layer portion can only pertain to one of the responses (i.e. to one of the msgAs/wireless devices). If a response in a msgB does not have an associated higher layer portion, this might be sent in a separate subsequent message, e.g. an RRC message, on the physical downlink shared channel ("PDSCH").

Upon a successful msgA reception, the network node 104 includes in msgB an indication to the wireless device that the msgA it transmitted was successfully received. That indication might include a contention resolution identity, a timing advance and a Cell Radio Network Temporary Identifier ("C-RNTI") allocation for the wireless device. This indication might be included at the media access control ("MAC") layer. It might be included within a sub-protocol data unit ("subPDU") of a MAC PDU. Specifically, it might be included within the successRAR MAC subPDU as a response for the concerned wireless device 102. If the network node 104 successfully received the PRACH preamble, but failed to receive msgA PUSCH, the network node 104 can respond to the wireless device 102 with afallbackRAR MAC subPDU in the msgB. The fallbackRAR essentially reverts the two-step RA procedure into the four-step RA procedure described above. Consequently, the fallbackRAR MAC subPDU contains an UL grant, a timing advance and a temporary C-RNTI (TC-RNTI) allocation, but no contention resolution identity. The wireless device 102 uses the UL grant to retransmit msgA PUSCH in the form of msg3.

Thus, in summary, msgB is a response to msgA, and may contain contention resolution message(s), fallback indication(s) to schedule Msg3 transmission, and a backoff indication. The msgB may contain responses to multiple wireless devices and with different kinds of information for different devices depending on the outcome of the msgA transmission/reception for those respective devices (and the load on the access resources).

In addition to successRAR andfallbackRAR MAC subPDUs, the network node 104 may include a parameter which is intended for wireless devices that did not receive a response to their respective msgA transmissions in msgB. This parameter is the Backoff Indicator (a single parameter for all wireless devices which did not find their expected response in the msgB). The Backoff Indicator controls whether and how much a wireless device must wait until it can attempt to access the network through random access again.

In certain implementations, it's possible for a two-step RA procedure and a four-step RA procedure to coexist within a cell provided by a network node. This can be done either through: (1) use of separate PRACH occasions (ROs) for the two-step and four-step RA procedures, or (2) through the use of shared ROs between the two-step and four-step RA procedures.

For case (1), each RO is only configured for either 2-step RA or 4-step RA. Such an RO might be referred to as a dedicated RO. For case (2), each RO is configured for both 2-step RA and 4-step RA (where the two RA types are distinguished by the PRACH preamble).

It is possible to configure all ROs to support 4-step RA, while a subset of them are shared ROs, i.e. a subset additionally support 2-step RA, while the remaining ROs are 4-step RA-only-ROs (i.e. they are only configured for 4-step RA). In other words, a subset of the ROs can be shared ROs and the remaining subset can be dedicated ROs.

In a shared RO, the PRACH preambles used for 4-step RA might be referred to as "4-step preambles", "4-step RA preambles" or "4-step PRACH preambles" etc., while the PRACH preambles used for 2-step RA might be referred to as "2-step preambles", "2-step RA preambles" or "2-step PRACH preambles" etc.

When 2-step RA and 4-step RA are configured in the cell provided by the network node, the wireless device—provided it is configured to support both RA types—selects 2-step RA if the device's perceived channel quality for the selected beam (e.g. measured as SS-RSRP) is above a configured threshold. This threshold is distinguished from the threshold rsrp-ThresholdSSB described above, and is referred to here as "rsrp-ThresholdTwoStepRA" or just "rsrp-Threshold". In other words, the wireless device might initially attempt to gain access to the network using the 2-step RA procedure.

The network can configure the maximum number of 2-step RA attempts a wireless device can perform before concluding that the 2-step RA has failed. When that happens, the wireless device may switch to 4-step RA (provided that 4-step RA resources are configured in the cell) and attempt to access the network using 4-step RA.

It's noted that in this context there is a distinction between a 'fallback' to 4-step RA from 2-step RA, and a 'switch' to 4-step RA from 2-step RA. Fallback to 4-step RA can be triggered by a fallbackRAR MAC subPDU in msgB (as described above), while a switch to 4-step RA is performed by the wireless device after failing to access the network using 2-step RA (e.g. because the selected beam does not satisfy the threshold "rsrp-Threshold".

When a wireless device switches from 2-step RA to 4-step RA, it might be preferable to receive the same size of the PUSCH allocation for msg3 114 as it had for msgA PUSCH 202, so that the msgA PUSCH can readily be retransmitted in the form of a msg3. Otherwise, the wireless device has to discard the content of the buffer holding the msgA PUSCH and construct, or build, a new msg3 and put it in the buffer in place of the discarded msgA PUSCH. This process is referred to as "re-building". Depending on the wireless device implementation, re-building can be a complex operation and some devices may implement support for re-building (but would for instance instead restart the random-access preparations from scratch), while it may be a more simple operation for other devices.

As mentioned above, Release 15 of the 3GPP specifications specifies the wireless device is to indicate its selected beam to the network node as part of the random-access procedure (whether for four-step or two-step). The random-access procedures are applicable to different RRC states of the wireless device. For example, when a device is in RRC IDLE mode, beam measurements can be based on synchronization signals carried within an SSB. Since each beam is mapped to a respective SSB, a wireless device can indicate a selected beam by indicating the associated SSB. When a wireless device is in RRC CONNECTED mode, beam measurements can be based on channel state information reference signals ("CSI-RSs") in the downlink and sounding reference signals ("SRSs") in the uplink. Like SSBs, a CSI-RS is associated with, i.e. mapped to, a specific beam. A CSI-RS can be mapped to, i.e. associated with, a beam through the channel state information ("CSI") parameter CSI-RS Resource Indicator ("CRI"). Thus, when in RRC CONNECTED mode, a wireless device can indicate a selected beam by indicating the CSI-RS Resource Indicator mapped to that beam.

Beam selection (e.g. through associated SSB or CRI indication) is conventionally indicated implicitly by selection of ROs and/or PRACH preambles, depending on the configuration, and works the same way in 2-step RA as in 4-step RA. That is, a specific SSB or CRI is indicated either by choice of RO, choice of preamble (e.g. through the preamble index) or a combination of these depending on the configuration. The same is true for CFRA, i.e. a specific SSB or CRI is indicated either by choice of RO, choice of preamble or a combination of these.

As mentioned above, as the number of supported beams increases, ROs and PRACH preambles become a scarcer resource and the RA configuration will have to balance the latency and overheads of increased ROs with the demand for allocations of preamble indices for different purposes than beam indication.

Figure 5:
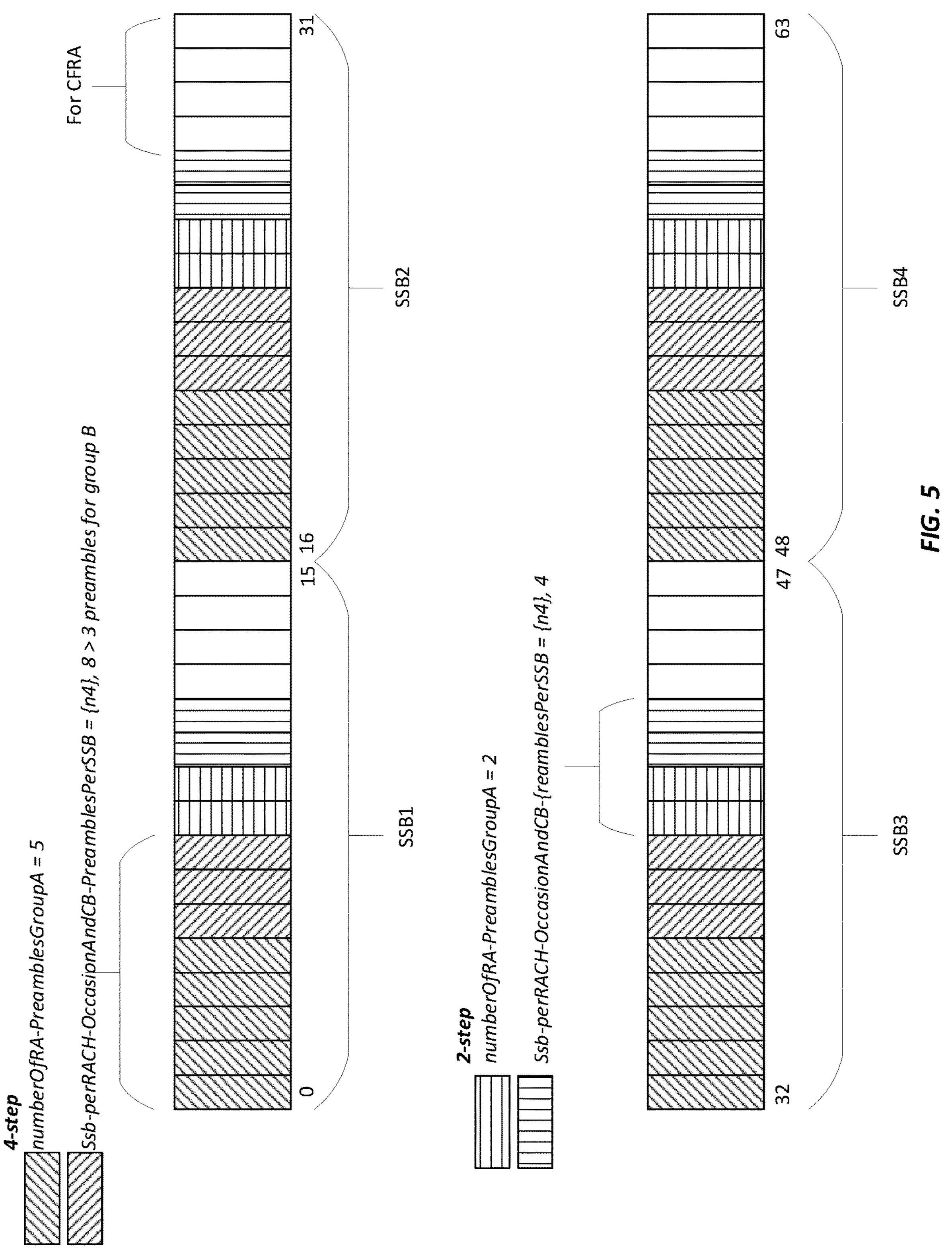
FIG. 5 illustrates an example mapping of four SSBs to each RO.

An illustration of the demands that can be placed on preamble allocation is shown in FIG. 5. In this scenario, four SSBs are mapped to each RO, and each RO is shared between 4-step and 2-step RA. Thus, here, the implicit indication of the SSB is done through the combination of RO and preamble index. In this particular example, for a single SSB:

- preamble indices 0-4 are assigned for preamble group A in 4-step RA,
- preamble indices 5-7 are assigned for preamble group B in 4-step RA,
- preamble indices 8-9 are assigned for preamble group A in 2-step RA
- preamble indices 10-11 are assigned for preamble group B in 2-step RA
- preamble indices 12-15 are assigned for CFRA.

Group A and group B are two groups of random-access preambles defined by the 3GPP specifications. The number of preambles in preamble group A (five for 4-step RA and two for 2-step RA in this example) can be specified by the RRC parameter numberOfRA-PreamblesGroupA.

The number of preambles in preamble group B (three for 4-step RA and two for 2-step RA in this example) can be specified by the RRC parameter ssb-perRACH-OccasionAndCB-PreamblesPerSSB.

Thus, in this example, 16 preamble indices are required for one SSB. Since four SSBs are mapped to each RO, a total of 64 preambles indices are required for a single RO. This serves to illustrate that mapping several SSBs to a RO is resource-efficient in terms of the PRACH and PUSCH resources used and may be beneficial for latency, but is costly from preamble allocation.

As described above, the PRACH and preamble resources are easily exhausted when the number of SSBs is large since preambles need to be split between SSBs/SSB groups.

It has therefore been appreciated that the current approaches of indicating a selected beam implicitly through the use of specific preambles and/or RO can readily lead to the exhaustion of PRACH and preamble resources for larger numbers of beams. If the number of supported beams increases, the network node might need to configure more resources for preambles and PRACH occasions. In configurations with a large number of beams, which it's anticipated will be common in evolved systems, this will lead to a large overhead in terms of PRACH resources and increased latency unless several SSBs share the same PRACH occasion. This, however, can be costly in terms of preamble allocation.

The issue of increasing overhead could in principle be mitigated by configuring more preambles per cell. For NR, up to 64 preambles can currently be configured in each time-frequency PRACH occasion in a cell. To further extend the number of preambles to be greater than 64 may be difficult for NR systems. From a technology perspective, it may not be feasible to introduce a large increase of the preamble number. Preamble sequences are typically generated from root sequences. For a small cell, it is feasible to generate all 64 preambles based on a single root sequence. However, for larger cells, a larger cyclic shift needs to be configured. In order to generate all 64 preamble sequences in this case, multiple root Zadoff-Chu sequences are likely needed. Even if a large number of root sequences is not a limit in itself, the zero cross-correlation property of the sequences only holds between shifts of the same root sequence and from an interference perspective it is therefore beneficial to use as few root sequences as possible.

The present disclosure describes approaches for addressing the problem of preamble and PRACH resource utilization in random access procedures. According to these approaches, the beam selected by the wireless device (associated with an SSB or CRI) is not indicated via preambles and/or ROs but instead via information contained in the RACH message content (msgA for 2-step RA, or Msg3 for 4-step RA). The network node can deduce which beam the wireless device has selected from the information content of the PUSCH payload instead of the received preamble and RO and their mapping to a beam. This will be described with reference to various examples, below.

Figure 6:
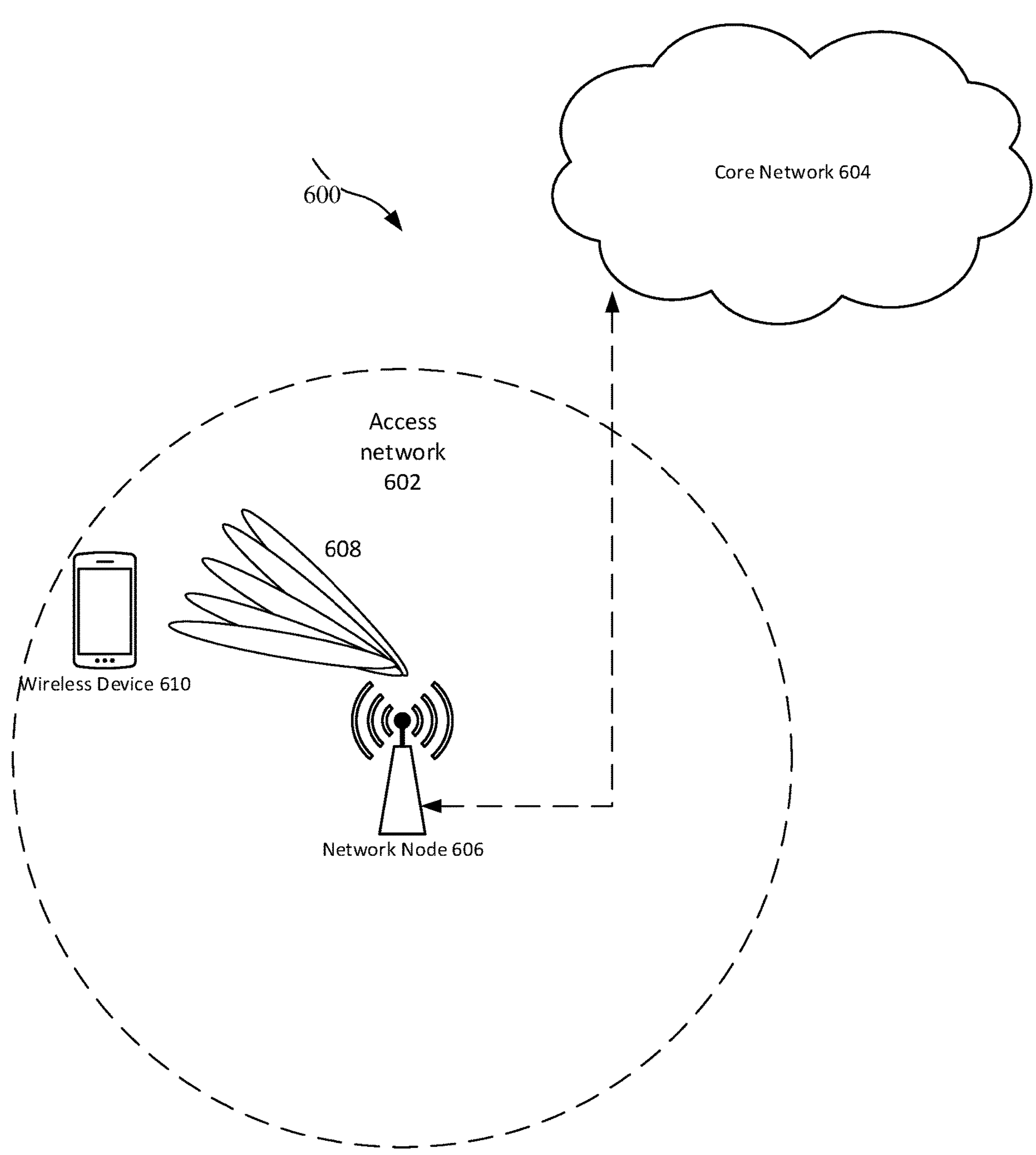
FIG. 6 illustrates a wireless communication network.

FIG. 6 shows a wireless communication network 600 comprising an access network 602 and a core network 604. The access network 602 is provided by a network node 606, which transmits multiple beams 608 via beam sweeping. The network node 606 is communicatively connected to the core network 604. Also shown is a wireless device 610, shown here within the coverage area of access network 602.

For simplicity, the wireless network of FIG. 6 only depicts access network 602, core network 604, network node 606, and wireless device 610. In practice, a wireless network may further include any additional elements suitable to support communication between wireless devices or between a wireless device and another communication device, such as a landline telephone, a service provider, or any other network node or end device. Of the illustrated components, network node 606 and wireless device 610 are depicted with additional detail in FIGS. 7 and 8 respectively, described below. The wireless network 600 may provide communication and other types of services to one or more wireless devices to facilitate the wireless devices' access to and/or use of the services provided by, or via, the wireless network.

In this example, the wireless network operates according to the 3GPP 5G standards. In this context, the network node 606 typically corresponds to a gNB; and the wireless device 610 typically corresponds to a user equipment ("UE"). The gNB is part of the radio access network 602, which in this case is the NG-RAN (Next Generation Radio Access Network). Though this example is described in the context of a 5G network, the examples described herein are not limited to such a network and can be implemented within networks operating according to different telecommunication standards in which beam forming is supported.

Figure 7:
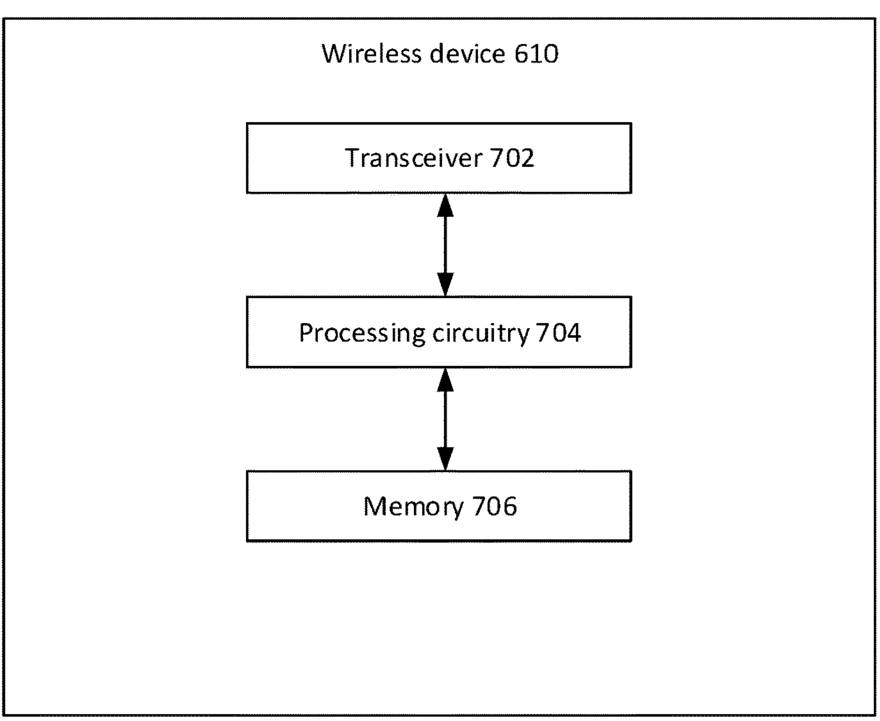
FIG. 7 shows example components of a wireless device communicating over the network of FIG. 6.

FIG. 7 shows a more detailed view of wireless device 610 configured to operate according to the examples described herein. As shown, the wireless device 610 may include a transceiver circuit 702 (also referred to as a transceiver) including a transmitter and a receiver configured to provide uplink and downlink radio communications with network node 606. The wireless device 610 may also include a processing circuitry 704 (also referred to as a processor) coupled to the transceiver circuit 702, and a memory circuit 706 (also referred to as memory) coupled to the processing circuitry 704. The memory circuit 706 may include computer readable program code that when executed by the processing circuitry 704 causes the processing circuitry to perform operations according to embodiments disclosed herein, for example those described with respect to FIG. 9 below. According to other embodiments, processing circuitry 704 may be defined to include memory so that a separate memory circuit is not required. The memory circuit 706 is an example of a non-transitory computer-readable storage medium.

As discussed herein, operations of the wireless device 610 may be performed by processor 704 and/or transceiver 702. For example, the processor 704 may control transceiver 702 to transmit uplink communications through transceiver 702 over a radio interface to one or more network nodes and/or to receive downlink communications through transceiver 702 from one or more network nodes over a radio interface. Moreover, modules may be stored in memory 706, and these modules may provide instructions so that when instructions of a module are executed by processor 704, processor 704 performs respective operations (e.g., operations discussed below with respect to example embodiments).

Accordingly, a wireless device 610 according to some embodiments includes a processor circuit 704, a transceiver 702 coupled to the processor circuit, and a memory 706 coupled to the processor circuit, the memory including machine readable program instructions that, when executed by the processor circuit, cause the wireless device to perform operations described above.

Figure 8:
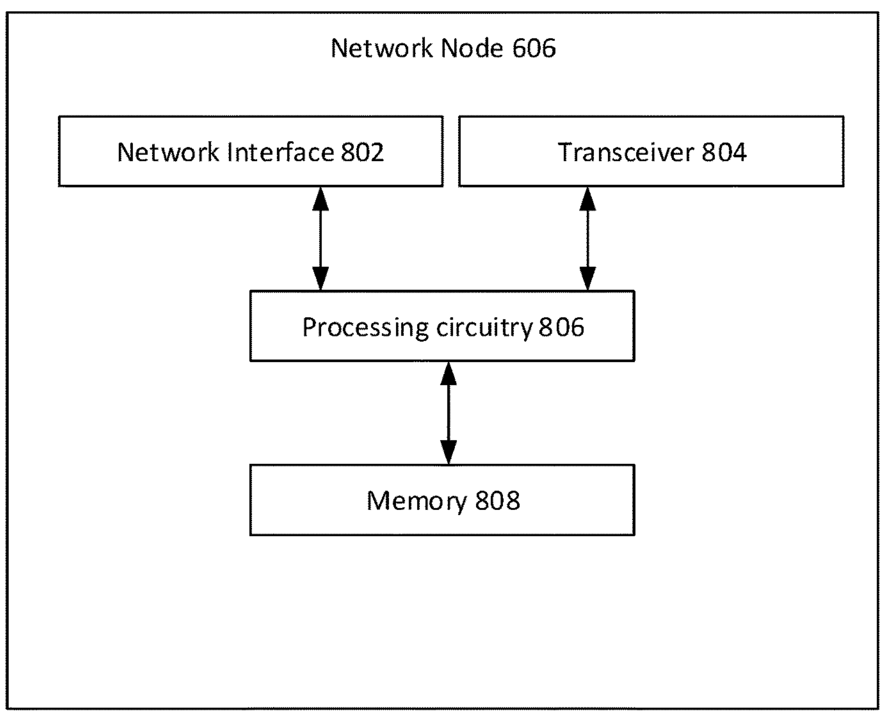
FIG. 8 shows example components of a network node of the communication network of FIG. 6.

FIG. 8 depicts an example of a radio access network node 606 of a wireless communication network configured to provide cellular communication according to examples described herein. The network node 606 may include a network interface circuit 802 (also referred to as a network interface) configured to provide communications with other nodes (e.g., with other base stations and/or core network nodes, e.g. of core network 604) of the wireless communication network. The network node 606 may further include a wireless transceiver 804 for performing wireless communications with wireless device 610. The memory circuit 808 (also referred to as memory) may include computer readable program code that when executed by the processor circuit 806 causes the processor circuit to perform operations according to embodiments disclosed herein. According to other embodiments, processor circuit 806 may be defined to include memory so that a separate memory circuit is not required. The memory circuit 808 is an example of a non-transitory computer-readable storage medium.

As discussed herein, operations of the network node 606 may be performed by processor 806, wireless transceiver 804 and/or network interface 802. For example, processor 806 may control network interface 802 to transmit communications through network interface 802 to one or more other network nodes and/or to receive communications through network interface from one or more other network nodes. Moreover, modules may be stored in memory 808, and these modules may provide instructions so that when instructions of a module are executed by processor 806, processor 806 performs respective operations.

Various approaches for how wireless device 610 can indicate a selected beam to network node 606 will now be described. The selected beam might be associated with either an SSB or a CSI-RS (e.g. through an SSB index and CSI-RS Resource Indicator (CRI) respectively); that is, the beam may be mapped to an SSB and/or CSI-RS such that an indication of the SSB (via the SSB index) and/or CSI-RS (via the CRI) provides to the network node 606 an indication of the selected beam. Put another way, the SSB index and/or CRI can serve as an identifier for the selected beam.

According to at least some of these examples, the wireless device 610 indicates the selected beam within the content of the PUSCH payload of a RACH message transmitted as part of the RA procedure. The RA procedure might be the 2-step RA procedure or 4-step procedure described above. In the event the RA procedure is the two-step RA procedure, an indication of the selected beam can be provided within the PUSCH portion of msgA, i.e. within msgA PUSCH (message 212 in FIG. 2). In the event the RA procedure is the four-step RA procedure, an indication of the selected beam can be provided within the PUSCH message msg3 (message 114 in FIG. 1). In any event, the selected beam is indicated in message content transmitted on the PUSCH during the RA procedure.

For example, the selected beam may be indicated within a set of N bits within the PUSCH payload (e.g. within the PUSCH portion of msgA or within msg3). This set of N bits might be a set of bits dedicated to indicating beam selection. The value of N can vary according to different examples.

In one example, the N bits are an N-bit bitmap field used to indicate to the network node 606 the selected beam. That is, the bitmap field can be used to index, or identify, the selected beam from the multiple beams transmitted by the network node. Information on which beams are transmitted by the network node 606 can be provided to the wireless device 606. This information itself might be provided in the form of a bitmap. This bitmap might contain a set of bits each corresponding to a respective beam of a set of beams. The set of beams might for example be the total set of beams that can be supported by the wireless network. Thus, for a 5G network, the bitmap provided by the network node 606 may contain 64 bits, because up to 64 beams can currently be supported in 5G networks. The bitmap provided by the network node then identifies the beams from this set of beams that are actually transmitted by the network node. This bitmap might be provided from the network node in an RRC message, for example within the bitmap field in the RRC information element ("IE") ssb-PositionInBurst.

The N-bit bitmap field within the PUSCH payload might be equal in size to the bitmap received from the network node that identifies which beams are transmitted by the network node. Thus, the N-bit bitmap field might be equal in size to the RRC IE ssb-PositionInBurst.

Alternatively, the N-bit bitmap field in the PUSCH payload may be equal in size to the number of beams transmitted by the network node (e.g. as indicated by the bitmap received from the network node). This conveniently can enable the size of N to be reduced because it might only be required to index a smaller subset of beams. For example, the bitmap from the network node might indicate that of the set of (e.g. 64) beams, 8 beams are transmitted. The N-bit bitmap field contained within the PUSCH payload could then be an 8-bit bitmap that indicates one of those transmitted beams as the selected beam.

In yet another example, the value of N can be equal to the minimum number of bits required to encode the number of beams transmitted by the network node. Thus, N may be equal to the minimum bit-size to code the number of beams transmitted by the network node indicated by ssb-PositionInBurst. For example, in the case that the network node indicates that 8 beams are transmitted, the value of N would be 3, because three bits is sufficient to encode 8 beams. This approach conveniently reduces the value of N further, reducing overhead.

In the above examples, the wireless device indicates the beam directly. That is, the PUSCH payload contains content that indexes the selected beam (e.g. with reference to a bitmap received from the network node identifying the beams transmitted by the network node). In other examples, the wireless device might indicate the beam by indicating the associated SSB or CSI-RS resource. This might be done through a suitable index, or identifier.

For example, the wireless device might include within the content of the PUSCH payload:

- an identifier of the SSB or SSB group for the selected beam (e.g. the SSB index or SSB group index);
- an identifier of the CSI-RS resource for the selected beam (e.g. a CSI-RS resource identifier (CRI));
- the index of the transmission configuration indicator ("TCI") state which is associated with the UL/DL beam/beam set that are used for the random access.

The information in the PUSCH payload indicating the selected beam (e.g. according to the examples above) might be carried within a media access control ("MAC") sub-header of the random-access message. Conveniently, it might be carried within an existing MAC sub-header, for example within one or more R-header fields of a MAC sub-header. That is, available R bits might be used to carry the index used to indicate the selected beam. Alternatively, the information might be carried within a MAC control element ("MAC CE"). This might be an existing MAC CE or a newly-defined MAC CE dedicated to indicating the selected beam.

In another set of examples, the PUSCH payload of the random-access message (e.g., Msg3 for a 4-step RA, msgA PUSCH for a 2-step RA) may comprise an RRC message carrying the information for indicating the selected beam, where the information may be of one of the types described above.

Figure 9:
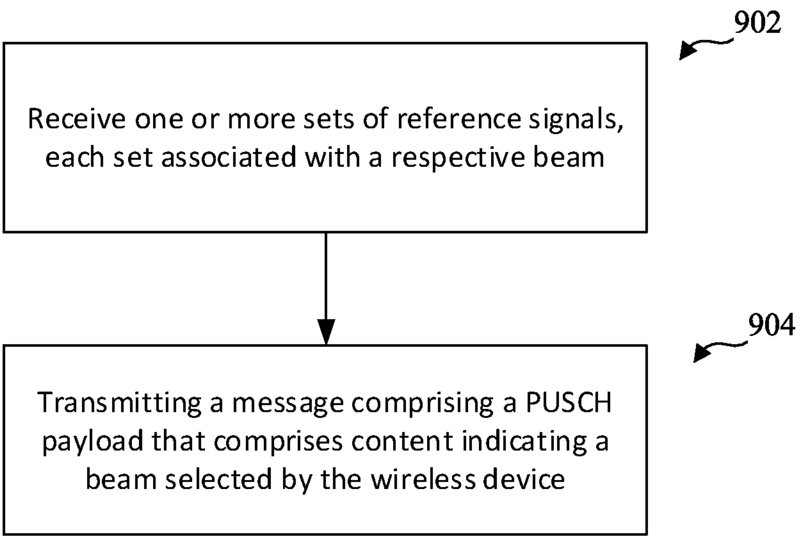
FIG. 9 is a flowchart of steps performed by the wireless device for indicating a selected beam to a network node.

FIG. 9 illustrates example steps of a method performed by wireless device 610 for indicating a selected beam to network node 606 as part of a random-access procedure, according to the present disclosure.

The random-access procedure might be a two-stage random-access procedure or a four-stage random-access procedure of the types described above.

Network node 606 performs beam sweeping. The network node 606 performs beam sweeping by transmitting a series of beams in different directions at periodic time intervals. Each of these beams carries a respective set of one or more reference signals associated with that beam. For example, the set of reference signals might include the PSS, SSS and PBCH carried by an SSB. Alternatively, the set of reference signals might include the CSI-RS. This is as described above.

At step 902, the wireless device 606 receives one or more sets of reference signals from the network node, each set of reference signals associated with a respective beam. Put another way, the wireless device 606 receives one or more beams, where each beam carries a respective set of references signals. The wireless device then selects one of the received beams (e.g. in accordance with the received reference signal strength of the beams). This may be referred to as beam selection, with aspects described in more detail above with respect to FIGS. 1 and 2.

Having performed beam selection, the wireless device transmits a random-access message comprising a PUSCH payload to the network node as part of a random-access channel (RACH) procedure. The PUSCH payload comprises content indicating the beam selected by the wireless device. In the event of 2-step RA, the random access message can be msgA, and the PUSCH payload msgA PUSCH. In the event of 4-step RA, the random-access message can be msg3. The content indicating the selected beam may be in accordance with any of the examples described above.

Following step 904, the wireless device might perform additional steps to complete the random-access procedure. For example, the wireless device might then receive the CRM 116 for four-step RA, or it might receive msgB 204 for two-step RA. The RA procedure might transition from four-step to two-step, depending on network conditions.

The techniques described herein can free up PRACH preambles by removing the SSB to preamble mapping for beam indication in RA. This may be particularly advantageous where preambles are scarce, e.g. where 2-step RA and 4-step RA share ROs and several SSBs are mapped to each RO. It will also be particularly advantageous in evolved systems with an extensive number of DL beams. By removing the preamble and RO to beam mapping, the techniques herein allow more preambles to be configured for both CBRA (both preamble group A and preamble group B for both 2-step and 4-step) and CFRA, which allows more diverse RACH configurations and support of higher RACH load since preamble collision probability will be reduced.

According to another embodiment of the present disclosure, for a RA, a set of configured grant-based resources are configured by the gNB. The UE can use a selected configured grant resource to transmit a RACH message (e.g., Msg3 for a 4-step RA, MsgA PUSCH for a 2-step RA). There is a mapping relation between configured grant resources (or msgA PUSCH for 2-step) and the beams. This mapping relation might be predetermined. It might be configured by the gNB. The gNB might configure the UE with the mapping. The mapping might be in the form of a table. Since each beam is associated with at least an SSB or a CSI-RS resource (e.g. via an SSB index or CRI respectively), the mapping relation can be further configured between configured grant or msgA PUSCH resources and SSBs and/or CSI-RS resources. That is, the mapping might be between configured grant or msgA PUSCH resources and SSB indices and/or CRIs. When a RA procedure is triggered, the UE measures radio channel quality of the beams as described above (e.g., in terms of RSRP of the SSBs or CSI-RSs associated with the beams), and selects the strongest beam. From the mapping table, the UE further selects one or multiple configured grants or msgA PUSCH resources mapped to the selected beam. These selected configured grant can be used to transmit the RA messages associated with the triggered RA procedure. The gNB can determine from the selected configured grant and the mapping the beam selected by the UE.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 906, network nodes 960 and 960*b*, and wireless devices ("WDs") 910, 910*b*, and 910*c*. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 960 includes processing circuitry 970, device readable medium 980, interface 990, auxiliary equipment 984, power source 986, power circuitry 987, and antenna 962. Although network node 960 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 992 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 10 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. AWD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 912 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

The invention claimed is:

1. A method performed by a wireless device for indicating a selected beam to a network node within a communication network, the method comprising:

transmitting a random-access message comprising a physical uplink shared channel (PUSCH) payload as part of a random-access channel (RACH) procedure to the network node, wherein the PUSCH payload comprises content indicating the beam selected by the wireless device, and wherein the PUSCH payload comprises N bits dedicated to indicating the selected beam and the N bits are based on a message received from the network node that indicates which beams are transmitted by the network node.

2. The method of claim 1, wherein the RACH procedure is a two-step RACH procedure and the message is msgA comprising a RACH preamble and the PUSCH payload.

3. The method of claim 1, wherein the RACH procedure is a four-step RACH procedure and the message is Msg3 transmitted on the PUSCH.

4. The method of claim 1, wherein the content in the PUSCH payload indicates the selected beam via a synchronization signal block (SSB) index for the SSB associated with the selected beam.

5. The method of claim 1, wherein the content in the PUSCH payload indicates the selected beam via a channel state information reference signal (CSI-RS) resource index associated with the selected beam.

6. The method of claim 1, wherein the N bits of the PUSCH payload are an N-bit bitmap field that indicates the selected beam and is equal in size to a bitmap field of a message received from the network node that indicates which beams are transmitted by the network node.

7. The method of claim 6, the method further comprising:

receiving the message from the network node containing the bitmap field indicating which beams are transmitted by the network node.

8. The method of claim 6, wherein the message received from the network node is a radio resource control (RRC) message containing the information element (IE) ssb-PositioninBurst that comprises the bitmap field.

9. The method of claim 1, wherein the N bits of the PUSCH payload are an N-bit bitmap field that indicates the selected beam, where the value of N is equal to the number of beams transmitted by the network node as indicated by a bitmap field of a message received from the network node that indicates which beams are transmitted by the network node.

10. The method of claim 1, wherein the value of N is equal to the minimum number of bits required to encode the number of beams transmitted by the network node as indicated by a bitmap field of a message received from the network node that indicates which beams are transmitted by the network node.

11. The method of claim 1, wherein the content is carried within a media access control (MAC) sub-header of the random-access message.

12. The method of claim 11, wherein the content is carried within one or more R-header fields of the MAC sub-header.

13. The method of claim 1, wherein the content is carried within a MAC control element (MAC CE).

14. The method of claim 13, wherein the MAC CE is dedicated to indicating the beam selected by the wireless device.

15. The method of claim 1, wherein the content is carried within an RRC message included in the PUSCH payload.

16. A wireless device for indicating a selected beam to a network node within a communication network, the wireless device being configured to:

transmit a random-access message comprising a physical uplink shared channel (PUSCH) payload as part of a random-access channel (RACH) procedure to the network node, wherein the PUSCH payload comprises content indicating the beam selected by the wireless device, and wherein the PUSCH payload comprises N bits dedicated to indicating the selected beam and the N bits are based on a message received from the network node that indicates which beams are transmitted by the network node.

17. A wireless device for indicating a selected beam to a network node within a communication network, the wireless device comprising:

transceiver circuitry;

processing circuitry; and a memory storing instructions executable by the processing circuitry to cause the wireless device to transmit, via the transceiver circuitry, a random-access message comprising a physical uplink shared channel (PUSCH) payload as part of a random-access channel (RACH) procedure to the network node, wherein the PUSCH payload comprises content indicating the beam selected by the wireless device, and wherein the PUSCH payload comprises N bits dedicated to indicating the selected beam and the N bits are based on a message received from the network node that indicates which beams are transmitted by the network node.

* * * * *